United States Patent [19]

Rollins et al.

[11] 4,209,815
[45] Jun. 24, 1980

[54] CAPACITOR PROTECTIVE CIRCUIT

[75] Inventors: Richard L. Rollins, Williamstown, Mass.; Thomas T. Paquin, North Bennington, Vt.

[73] Assignee: Jard, Inc., Bennington, Vt.

[21] Appl. No.: 896,719

[22] Filed: Apr. 17, 1978

[51] Int. Cl.² .............................................. H02H 7/16
[52] U.S. Cl. ..................................... 361/15; 361/275; 361/274
[58] Field of Search ..................... 361/15, 16, 17, 272, 361/274, 275

[56] References Cited

U.S. PATENT DOCUMENTS

| | | | |
|---|---|---|---|
| 3,248,617 | 4/1966 | Hynes et al. | 361/274 |
| 3,304,473 | 2/1967 | Netherwood et al. | 361/272 |
| 3,377,510 | 4/1968 | Rayno | 361/15 |
| 4,106,068 | 8/1978 | Flanagan | 361/15 |
| 4,107,758 | 8/1978 | Shirn et al. | 361/274 X |

Primary Examiner—Patrick R. Salce
Attorney, Agent, or Firm—Kane, Dalsimer, Kane, Sullivan and Kurucz

[57] ABSTRACT

A liquid dielectric capacitor is provided housed in a sealed casing having a noncircular cross-section. The casing includes a sealed top cover to which terminals are affixed. An elongated flexible plate member is positioned within the casing spanning a major diameter of the casing. The ends of the plate member substantially abut the interior walls of the casing along the major diameter. Breakable, electrical conductors are affixed to the terminals and plate member. The plate member is preconditioned to bow downwardly, away from the casing top, when the ends of the plate member are subjected to inwardly directed forces, as when a pressure buildup occurs within the casing. The conductors are adapted to break when the relative distance between the terminal and plate exceeds a preselected value.

6 Claims, 4 Drawing Figures

CAPACITOR PROTECTIVE CIRCUIT

BACKGROUND OF THE INVENTION

The present invention relates to liquid dielectric capacitors and more particularly to a protective circuit for such capacitors.

Liquid dielectric capacitors, such as those commonly used in ballasts for fluorescent light fixtures, air conditioners, and the like, are subject to failure due to a "thermal runaway" condition wherein the temperature and pressure within the capacitor casing rise rapidly and uncontrollably. The pressure buildup may cause a rupture in a seam of the capacitor casing thereby permitting the liquid dielectric to flow from the casing into contact with other electrical components. This may cause damage to the electrical fixture or anything else onto which the dielectric may spill.

It has been observed that the thermal runaway condition can be halted if the capacitor is deenergized sufficiently early once the thermal runaway process begins. There is a point, however, at which the pressure buildup within the capacitor will continue regardless of whether or not the capacitor is thereafter deenergized. Accordingly, it is extremely important to deactivate the capacitor as soon as possible after thermal runaway begins to prevent the point of no return from being reached.

Heretofore, various schemes have been suggested to protect liquid dielectric capacitors from the effects of an excess energy buildup. Such prior art devices are disclosed, for example, in U.S. Pat. Nos. 1,578,563; 2,572,901; 2,896,049; 3,246,205; 3,248,617; and, 3,377,510.

In the main, the prior art devices rely on the pressure buildup within the capacitor can to cause swelling of the can cover. As the swelling progresses, it causes a rupture in an electrical lead running between the capacitance means and terminals on the can cover. To this end, a portion of the electrical lead is held fixed while the cover bulges so as to impart a stress to the lead. In addition, the lead may be preweakened or otherwise adapted to rupture upon bulging of the cover.

The principal object of the present invention is to provide an improved protective circuit for a liquid dielectric capacitor which responds more quickly and efficiently to pressure buildups within the capacitor can than was heretofore possible with existing devices.

A further object of the invention is to provide a protective circuit for such liquid dielectric capacitors wherein the possibility of accidental reconnection of the electrical leads, once disconnected, is avoided.

A still further object of the present invention is to provide such a protective circuit which may readily and easily be incorporated into conventional liquid dielectric capacitor cans with a minimum of modification or redesign of existing components.

SUMMARY OF THE INVENTION

The above and other beneficial objects and advantages have been attained in accordance with the present invention. The invention comprises a liquid dielectric capacitor in the form of a sealed casing having a noncircular, cross-section with at least one major axis. A conventional top cover is hermetically sealed to the case and terminals extend through the top cover for making connection with liquid dielectric capacitance means sealed within the casing. To this end, breakable, electrical conductor leads are positioned within the casing extending between the capacitance means and the terminals. An elongated, flexible plate member is positioned within the casing between the capacitance means and portions of the terminals that extend through the cover. The plate member is aligned along the major axis and has its opposite ends substantially abutting the interior walls of the casing. The plate member is preconditioned to bow downwardly (i.e., away from the cover) in response to inwardly directed forces on the plate member opposite ends. Conversely, the cover is of conventional design for such capacitors and is designed to bulge upwardly in response to a buildup of internal pressure within the casing. The conductor leads are fixed to both the plate member and the terminals and are adapted to break when subjected to a preselected stress which, in turn, is related to the relative distance between the terminals and plate. Since the terminals are affixed to the cover and the cover and plate move in opposite directions in response to a buildup of pressure within the casing, the time required for the breakable conductors to fracture is greatly reduced and hence the response time and effectiveness of the protective circuit is greatly enhanced.

DETAILED DESCRIPTION OF THE PREFERRED EMBODIMENT

Figure 1:
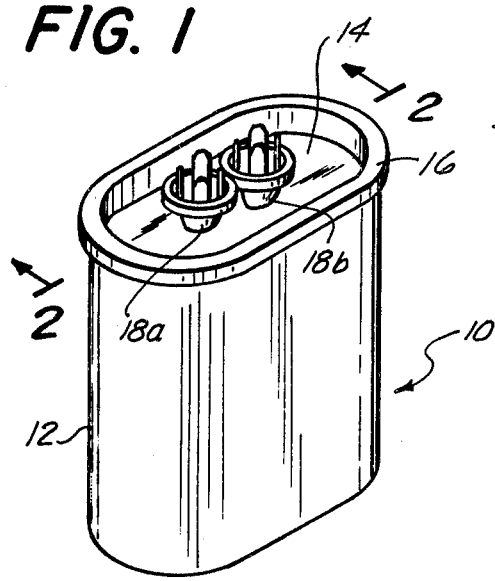
FIG. 1 is a perspective view of an improved liquid dielectric capacitor in accordance with the present invention.

Reference is now made to the drawings and to FIG. 1 in particular wherein the improved liquid dielectric capacitor 10 in accordance with the present invention is shown. The capacitor comprises a sheet metal can or casing 12 stamped to define integral walls and a bottom section. The top of the casing is closed by a cover 14 which is hermetically sealed to the can walls along a rim 16 defined by interlocking rolled lips of the cover and can. A pair of insulated terminal posts 18a and 18b extend upwardly from the cover and are rigidly secured to the cover. The terminal posts contain therein terminals 20a and 20b which make electrical contact with the liquid dielectric medium within the casing in a manner to be described forthwith.

Contained within the casing is a flattened, wound capacitor roll section 22 of conventional construction. Suffice it to say for the present application, electrode foils are interwound with dielectric spacer sheets and then flattened so as to assume an oval configuration. The roll fits closely within the oval casing 12 and is immersed in a dielectric liquid 24 as for example chlorinated diphenyl or mineral oil.

Figure 2:
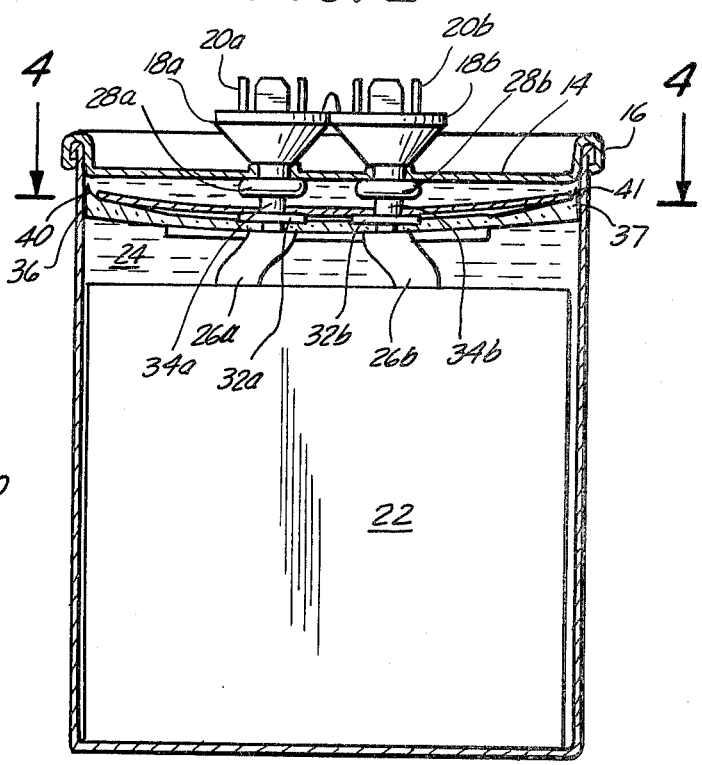
FIG. 2 is a sectional view taken along reference lines 2—2 of FIG. 1 in the direction indicated by the arrows and depicts the capacitor in normal condition prior to operation of the circuit breaker.

As shown in FIG. 2, the terminals 20a and 20b are electrically connected to conductors 26a and 26b which extend into the capacitor roll section. Conductors 26a and 26b comprise thin metallic ribbons secured to the terminals by insulating bushings 28a and 28b. The bushings also serve to electrically isolate the conductors from cover 14.

The above description applies to present liquid dielectric capacitors and the components discussed are well known and defined in the art.

In accordance with the present invention, a flexible plate 30 of a nonconducting material, such as nylon, is positioned within the casing between the cover 14 and capacitance rolls 22. Conductors 26a and 26b are secured to plate 30 by bushings 32a and 32b. Thus, the sections 34a and 34b of the conductors are each constrained at one end by a bushing 28a (or 28b) securing the conductor to terminal 20a (or 20b) and, at the other end, by a bushing 32a (or 32b) securing the conductor to plate 30. A sheet of insulating material, such as Kraft paper 33 overlies the plate and bushing.

Figure 4:
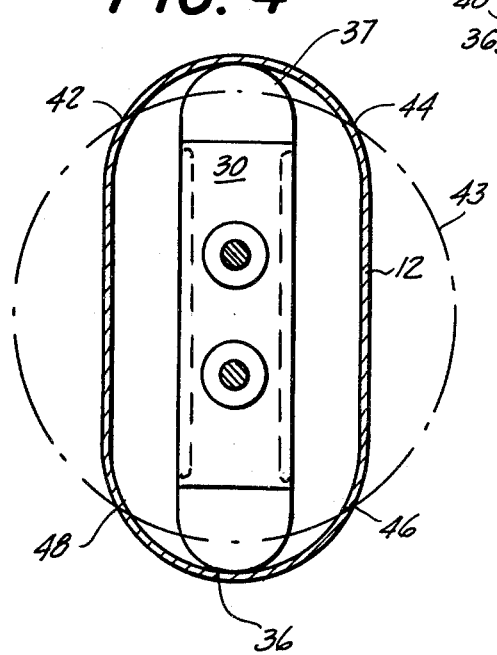

As stated, plate 30 is formed of a flexible material. The plate is substantially coextensive in length with the major axis of the oval casing so that its opposite ends 36 and 37 substantially abut the walls of the casing as shown in FIG. 4. As will be discussed, it is important to the present invention that upon pressurizing of the interior of casing 12 that plate 30 bow downwardly. To insure this, the plate 30 is preconditioned to bow downwardly by preforming it with a slight downward bow. In addition, the opposed ends 36 and 37 of the plate may be tapered upwardly to define tips 40 and 41 respectively that engage the bottom of cover 14. These tips provide fulcrums about which bowing of the plate may occur.

Figure 3:
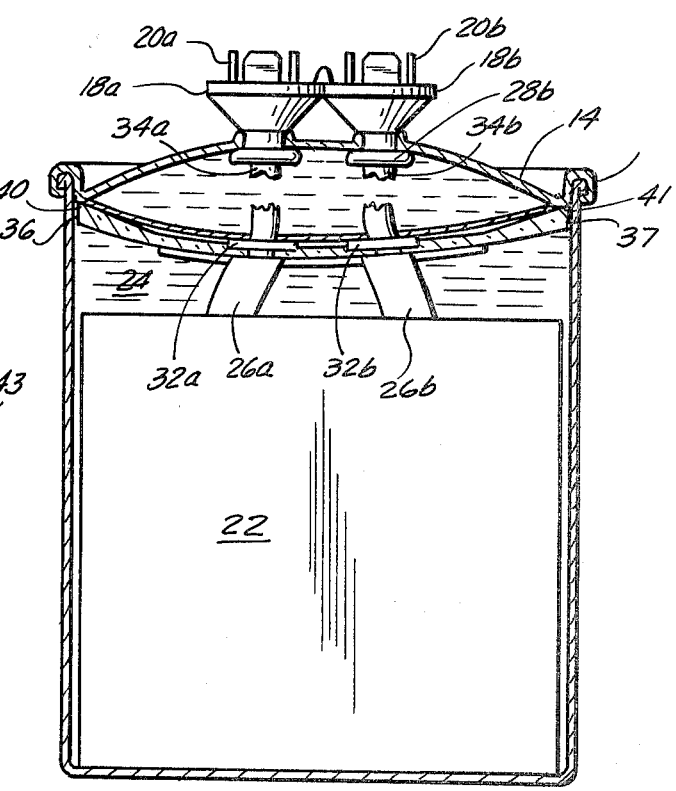
FIG. 3 is a view similar to FIG. 2 showing the arrangement after operation of the protective circuit breaker of the present invention; and, FIG. 4 is a sectional view taken along reference lines 4—4 of FIG. 2.

Under "thermal runaway" or any other malfunction of the capacitor whereby gas is generated, the pressure within the sealed casing rises. As a result of the increase in pressure, two phenomena occur substantially simultaneously. First of all, as is the case with conventional liquid dielectric capacitors, the pressure increase causes an outward bulging of cover 14 as shown in FIG. 3. Since the terminals are affixed to the cover they move with the cover. At the same time, the pressure exerted on the walls of the oval casing tend to deform the casing into a circular cross-section 43 as shown in phantom in FIG. 4. As a result, inward forces are applied along all major axes of the casing (i.e., the portions of the casing cross-section defined between points 42 and 44 and between points 46 and 48 where the diameter of the casing is greater than that of the phantom circle 43). The effect of these forces on the ends 36 and 37 of plate 30 is to further bow plate 30 downwardly as shown in FIG. 3. The increase in pressure within the casing thus has the double effect of bulging cover 14 upwardly while simultaneously causing plate 30 to move downwardly. Since the portions 34a and 34b of conductors 26a and 26b between the terminals and plate are fixed to both the upwardly moving cover and downwardly moving plate, a stress is imparted on this portion related to the displacement of the cover with respect to the plate. By suitably dimensioning portions 34a and 34b they can be caused to rupture when the stress imparted thereon reaches a preselected value. To this end, portions 34a and 34b may be of reduced dimension as compared with the remainder of conductors 26a and 26b as shown in FIG. 2. In addition, conductor portions 34a and 34b may be notched or otherwise weakened to make it more responsive to the applied stress when cover 14 and plate 30 move apart. Similarly, the various schemes suggested by the prior art for expediting the fracture of portions 34a and 34b may be employed in the present device.

As should be apparent from the above, it is critical to the present invention that plate 30 bow downwardly in response to increased pressure within casing 12. It has been found that this may be most effectively attained by prebowing member 30 downwardly. The tapered opposed ends 36 of the plate which bear against the undersurface of cover 14 also insure the downward bowing of plate 30. In addition, since it is desirable to have the separating action of cover 14 and plate 30 to begin as soon as possible, it is desirable to have the opposite ends of plate 30 as close as possible to the inside walls of the casing so that there is no lost motion while the walls start moving toward one another. Similarly, since it is the inward force on the ends of plate 30 that causes the downward bowing, it is important that the plate be oriented along a major axis of the casing.

In order to insure that both conductors rupture at substantially the same time, the terminal posts 18a and 18b are centered along the major axis of the oval cover. That is, each of the terminals is equidistant from the ends of the cover. As a result, the separation of the cover and plate will be the same for both terminals.

Since the casing and cover are formed of sheet metal, once these components are deformed, they maintain their newly deformed shape. Thus, cover 14 remains swelled and the casing walls continue to exert inward pressure on plate 30. As a result, the conductors once fractured cannot inadvertently reunite.

While the present invention has been discussed in the context of a two-terminal capacitor, it should be readily apparent that this invention is not to be limited to such a construction and would apply equally to multiterminal capacitors. In addition, while the invention has been discussed in the context of an oval capacitor can, it should be understood that any configuration other than circular may be utilized for the casing. Other variations and modifications will also become apparent to those having skill and familiarity with the art.

Having thus described the invention, what is claimed is:

1. In a liquid dielectric capacitor of the type comprising: a sealed casing having a noncircular cross-section with at least one major axis, a top cover for said casing, at least one terminal extending through said top cover, liquid dielectic capacitance means sealed within said casing, and a breakable electrical conductor within said casing extending between said capacitance means and said terminal, the improvement comprising: an elongated flexible plate member positioned within said casing between said capacitance means and said terminal, said plate member having opposed ends substantially abutting the interior of said casing along said major axis, said conductor being fixed to said plate member and being adapted to break when the relative distance between said terminal and plate exceeds a preselected value, said plate member being preconditioned to bow downwardly in response to inwardly directed forces on said plate member opposite ends and said casing interior surfaces along said major axis being adapted to move inwardly to apply inwardly directed forces on said plate member opposite ends in response to a build up of pressure within said casing.

2. The capacitor in accordance with claim 1 wherein said terminal is affixed to said top cover and adapted to move therewith.

3. The capacitor in accordance with claim 1 wherein said plate member is bowed downwardly.

4. The capacitor in accordance with claim 2 wherein said plate member is positioned below said cover and said plate member opposite ends have upwardly directed portions that abut said cover.

5. The capacitor in accordance with claim 1 wherein said casing is generally oval in cross-section.

6. The capacitor in accordance with claim 1 wherein two terminals extend through said top cover and said terminals are centered along said major axis.

* * * * *